Patented Nov. 6, 1945

2,388,417

UNITED STATES PATENT OFFICE 2,388,417

METHOD OF OBTAINING GLAND EXTRACTS

Robert L. Jones, Waukegan, Ill., assignor to Abbott Laboratories, a corporation of Illinois No Drawing. Application December 19, 1941, Serial No. 423,647

4 Claims. (Cl. 167—74)

The present invention relates to posterior pituitary glandular products and more particularly to an improved method for preparing stable oxytocic and pressor concentrates of high unitary value.

It has been known for some time that the posterior lobe of the pituitary gland obtained, for example, from animals such as cattle, sheep or pigs, was a source of active oxytocic and pressor principles. The pressor principle affects vasomotor activity generally, and the oxytocic principle acts more specifically to increase the expulsive power of the uterus. Previous attempts, however, to isolate the active principles which have been identified as complex hormone proteins, have not been completely satisfactory. For example, it has been found by following one of the basic prior art methods consisting essentially in water extraction followed by precipitation, that the yields were low and the final products obtained were highly contaminated by undesirable materials. Attempts to overcome these difficulties have necessitated tedious chemical purifications with various inorganic reagents and organic solvents, or the use of desiccated glandular material, or both. Such procedures or combinations thereof have left much to be desired.

It is therefore, the principal object of my invention to provide a satisfactory commercially practical process for obtaining oxytocic and pressor principles from fresh glands in higher yield and more desirable form for therapeutic use.

Other objects will be apparent as the description proceeds.

I have discovered after extended investigation that the characteristic disadvantages of the previously proposed processes may be overcome by the process herein described employing an aqueous lower monohydric alcohol extracting fluid. I have also discovered that the process may be improved (including the yields obtained thereby) by employing an acidic aqueous lower monohydric alcohol extracting fluid, i. e. an aqueous alcoholic fluid containing a small amount of acid. I have further discovered that dehydrating pituitary glands as well as so called preliminary chemical treatments thereof, have deleterious effects and that improved results are obtainable in accordance with the present invention by the use of fresh pituitaries as obtained from the abattoir.

The process of the present invention may be outlined as follows: the fresh posterior pituitaries are first extracted with an aqueous lower monohydric alcohol extracting fluid, preferably containing a small amount of acid; the extract obtained is chilled to precipitate lipids which are subsequently separated from the extract, e. g. by filtration; the extract or filtrate is concentrated under vacuum and at temperature below the decomposition temperature of the active principles, the concentration being sufficient to remove the low boiling alcohol; the active principles are salted out of the resulting aqueous concentrate by adding thereto a precipitating salt; the salt precipitate containing the active principles is separated from the salt, e. g. by dialysis; and the resulting supernatant liquid (free from any residues) is then sterilized in accordance with standard practices in the art. Variation in the process including the use of centrifuges, etc. may be employed as desired.

The following detailed example will serve to illustrate the present invention:

About 454 grams of fresh frozen posterior pituitary glands (obtained, for example, from beef pituitaries) are extracted by stirring for about 4 hours at room temperature with about 950 c. c. of 95% ethyl alcohol containing 40 c. c. of glacial acetic acid. The acid aqueous alcohol extract obtained is chilled over night at about 0° to 4° C. and separated from the lipid precipitate by filtration in the cold. The residue is then preferably re-extracted, chilled and filtered, as above, and the two filtrates or extracts combined. The combined extracts are then concentrated under vacuum to approximately one-fifth their original volume at a temperature not exceeding 35° C. and the resulting concentrated extract or liquid (which is rendered alcohol-free by the concentration) is centrifuged and any residue obtained discarded.

Sodium chloride is next added to the supernatant liquid to a concentration of approximately 25 per cent and the resulting mixture or solution allowed to stand in the cold for several hours. The sodium chloride precipitate obtained is filtered off, suspended in about 200–300 c. c of distilled water in a Cellophane cell and dialyzed against distilled water until free of sodium chloride. The non-dialyzable suspension is next removed from the cell and centrifuged in the usual manner. The supernatant liquid containing the desired principles is then adjusted to a pH of about 3.5–4.0 with acetic acid and sterilized in accordance with the general practice such, for example, as by Berkefeld filtration. After assay the concentrated solution diluted to the desired obstetrical or surgical strength is adaptable for therapeutic use without further treatment.

The extracting fluid used in the present invention should not contain too high a percentage of either water or alcohol. Investigations, for example, show that the alcohol concentration during extraction (i. e. after mixing with the natural water contained in the glands, acid if used, etc.) should be about 45 to 75 per cent, with a 60 per cent to 70 per cent alcohol concentration being preferred. In the above example the use of the 95 per cent alcohol with the specified amount of fresh moisture containing glands gives an alcohol concentration of approximately 65 per cent during extraction.

It will be understood that the present invention is not limited to the above illustrative example. For example, in place of acetic acid other lower molecular weight organic acids may be used as well as inorganic acids including mineral acids, such as hydrochloric acid. In the preferred method which includes the use of a small amount of acid, the pH of the extraction menstruum is below 7 and ordinarily about 4.6–5.0. In place of ethyl alcohol used in the illustrative example other lower monohydric alcohols or mixtures thereof which are water miscible, such as methyl and the propyl alcohols, may be used if desired. Also in place of sodium chloride other salts such as ammonium sulfate, sodium sulfate, etc. may be used in the salting out step to precipitate the active principles. For clarification and sterilization other filters such as the Mandler, Pasteur-Chamberland, Seitz, etc. may be used if desired.

In the final steps of the process the addition of acid brings the pH to a point at which the therapeutically active principles are more stable. Preferably after assaying, the concentrate is diluted with water containing a small amount of acid to adjust or maintain the pH of the final solution to about 3.5–4.0.

The process of the present invention makes it unnecessary to desiccate the glands to remove water and also makes it unnecessary to employ special organic solvents such as acetone to remove lipids. The process of the present invention, although free from tedious chemical purifications, gives excellent yields of desired principles in composition form very low in foreign and unwanted materials. The figure for nitrogen per unit of activity, for example, is much lower using the aqueous alcoholic extraction of the present invention than is obtained by aqueous extraction. This is due to the fact that the aqueous-alcoholic mixtures extract substantially less extraneous inactive protein than is extracted by water.

The process of the present invention has proven to be of the type desired and to meet the requirements of satisfactory commercial operation. The active principles prepared by the present process are also obtained in particularly good form for therapeutic use. Tests show the products resulting from the present process to have approximately a 50 to 50 ratio of active units of oxytocic principle to pressor principle.

It will be understood that the present invention is not limited to the illustrative example set forth above. All modifications coming within the scope of the present invention are intended to be covered by the claims annexed hereto.

I claim:

1. The steps in the method of preparing therapeutic concentrates containing active oxytocic and pressor principles which comprises subjecting fresh posterior pituitary glands to extraction with an aqueous lower monohydric alcohol extracting fluid, chilling the resulting extract and separating therefrom lipid precipitates formed during chilling, concentrating the extract under vacuum to a volume sufficient to remove the alcohol, adding sufficient salt to the resulting aqueous concentrate to precipitate the active principles, dialyzing a suspension of the precipitate to separate the salt from the suspension, and subjecting the resulting liquid containing the non-dialyzable active principles to sterilization, said extracting fluid containing a small amount of acid and being made up of sufficient monohydric alcohol to yield an alcoholic concentration of about 60–70 per cent during extraction.

2. The method of preparing a therapeutic oxytocic-pressor concentrate which comprises subjecting fresh posterior pituitary glands to repeated extractions with an aqueous acidic alcohol extracting fluid, chilling the extracts obtained by extraction and separating therefrom lipid precipitates formed during chilling, concentrating the combined extracts under vacuum at a temperature not exceeding about 35° C. and to a volume sufficient to remove the alcohol, adding sufficient sodium chloride to the resulting aqueous concentrate to precipitate the active principles, and separating the active principles from the salt and water insoluble residues, said extracting fluid being made up of a small amount of acetic acid and sufficient ethyl alcohol to yield an alcohol concentration of approximately 60–70 per cent during extraction.

3. The steps in the method of preparing therapeutic concentrates containing active oxytocic and pressor principles which comprises subjecting fresh posterior pituitary glands to extraction with an acidic aqueous lower monohydric alcohol extracting fluid, chilling the resulting extract and separating therefrom lipid precipitates formed during chilling, concentrating the extract under vacuum to a volume sufficient to remove the alcohol, adding sufficient salt to the resulting aqueous concentrate to precipitate the active principles, and dialyzing a suspension of the precipitate to separate the salt from the suspension, said extracting fluid containing sufficient acid to maintain the extraction menstruum at a pH of about 4.6–5.0 and sufficient lower monhydric alcohol to yield an alcoholic concentration of about 60–70 per cent during extraction.

4. The method of preparing a therapeutic oxytocic-pressor concentrate which comprises subjecting fresh posterior pituitary glands to repeated extractions with an aqueous acidic alcohol extracting fluid, chilling the extracts obtained by extraction to about 0°–4° C. and separating therefrom lipid precipitates formed during chilling, concentrating the combined extracts under vacuum at a temperature not exceeding 35° C. to approximately one-fifth their total volume, adding sodium chloride to the resulting concentrated liquid to a concentration of about 25 per cent, suspending the sodium chloride precipitate obtained by the salt treatment in distilled water, dialyzing the resulting suspension so as to remove substantially all of the sodium chloride from the suspension, adding acetic acid to the liquid obtained by dialysis to adjust the pH thereof to about 3.5–4.0 and subjecting the resulting acidic liquid to sterilization, said extracting fluid being made up of a small amount of acetic acid and sufficient ethyl alcohol to yield an alcohol concentration of approximately 65 per cent during extraction.

ROBERT L. JONES.